United States Patent [19]

Williams

[11] Patent Number: 4,668,567

[45] Date of Patent: * May 26, 1987

[54] METHOD FOR PRODUCING A HOLLOW MOLDED ARTICLE WITH A FILLING OF FOAMED PLASTIC THERMAL INSULATION, AND THE ARTICLE PRODUCED THEREBY

[75] Inventor: W. Jerry Williams, Owensboro, Ky.

[73] Assignee: Omico Plastics, Inc., Owensboro, Ky.

[*] Notice: The portion of the term of this patent subsequent to Oct. 15, 2002 has been disclaimed.

[21] Appl. No.: 771,360

[22] Filed: Aug. 27, 1985

Related U.S. Application Data

[63] Continuation of Ser. No. 443,789, Nov. 22, 1982, Pat. No. 4,546,899.

[51] Int. Cl.$^4$ .................. B29C 67/22; B29C 49/20
[52] U.S. Cl. .................. 428/319.9; 220/444;
220/902; 264/46.6; 264/46.8; 264/54; 264/516;
264/DIG. 1; 425/127; 425/817 R
[58] Field of Search .................. 264/46.6, 46.8, 516,
264/DIG. 1, 54; 220/444, 902; 428/319.9;
425/127, 817 R

[56] References Cited

U.S. PATENT DOCUMENTS

| 2,956,310 | 10/1960 | Roop et al. | 264/54 |
| 3,155,753 | 11/1964 | Weissman et al. | 264/46.6 |
| 3,736,201 | 5/1973 | Teraoka | 156/145 |

OTHER PUBLICATIONS

Ferrigno, T. H. *Rigid Plastics Foams*, New York, Reinhold Publ. Corp., ©1963, pp. 53–72 and 118–123.
*Encyclopedia of Polymer Science and Technology*, vol. 11, New York, Interscience Publishers, ©1969, pp. 537–548.

Primary Examiner—Philip Anderson
Attorney, Agent, or Firm—Cushman, Darby & Cushman

[57] ABSTRACT

The molded shell of an article, while still warm from being molded, and while remaining within the mold or fixture in which it has been created, for instance by blow-molding of a parison of polyolefin plastic material into contact with the mold walls, is filled with a fluid, settable foaming plastic material, for instance polyurethane. This may be done by injecting the foaming mixture directly into the cavity of the shell. In this manner time, labor and materials are saved, and the resulting product is characterized by better adhesion of the foamed core to the internal wall surface of the shell.

8 Claims, 6 Drawing Figures

METHOD FOR PRODUCING A HOLLOW MOLDED ARTICLE WITH A FILLING OF FOAMED PLASTIC THERMAL INSULATION, AND THE ARTICLE PRODUCED THEREBY

This is a continuation of application Ser. No. 443,789, filed Nov. 22, 1982, now U.S. Pat. No. 4,546,899.

BACKGROUND OF THE INVENTION

A variety of structural parts and complete articles is conventionally made by a process wherein the shell of the article is first blow-molded or similarly cast or molded. Sometimes the shell is made in two or more complementary sections which are then seamed together about a perimetrical rim e.g. by thermal bonding, acoustic welding or by an adhesive, in order to define an internal cavity. Such a process is conventionally used, even though it is obviously cumbersome, because it gives the manufacturer a chance to flame-etch on the sections the surfaces that will become the internal surfaces of the shell cavity, for increasing the adhesion of the core foam thereto. Then, after this shell is fabricated, set or cooled and removed from the mold or fixture, a foamed plastic composition is injected through an opening purposely made or left filling the cavity with foam which sets. Finally, the opening is plugged completing the creation of an article which has a typically dense, tough, cleanable skin with a lightweight core which has the bonus of being thermally insulative. Typical uses for such articles are as bodies and lids of picnic chests, coolers, hospital trays, enclosures for hot or cold casseroles of food, containers for chemical, medical, biological and pharmaceutical specimens and products, refrigerator cabinet boxes and doors, food service containers and enclosures for food service containers, and the like.

A typical thermoplastic material used to make the shell of such articles is polyethylene, polypropylene or the like.

A typical foamed plastic core is made of polyurethane by using a commercially available Gusmer Gun in accordance with its manufacturer's instructions. (Gusmer Corporation, Route 18 and Spring Valley Road, Old Bridge, N.J. 08857). In a standard Gusmer Gun system, as shown in FIG. 1 of the drawings, pressurized air is supplied at 10 through a regulator 12 and valve 14 to an air motor 16 the piston rod 18 of which is yoked at 20 to the piston rods 22 of the piston-type proportionating pumps 24, 26 respectively for resin and activator. The pumps 24, 26 in turn have their suction sides respectively communicated to supply drums 28, 30 of resin and activator. The pressure sides of pumps 24, 26 are communicated through respective heaters 32, 34 to respective inlet ports of a mixing and ejecting gun 36. Within the gun 36 the properly proportioned streams of heated resin and activator come together in a mixing chamber 38 from the front of which the foamable mixture is ejected through a nozzle (not seen in this rear view). Typically in the Gusmer Gun system, the resin tank contains a prepolymer of polyisocyanate, polyether polyol and a surfactant, and the activator tank contains catalysts and water. Systems of this general type have become well-known over the years and are rather completely described in the readily available trade literature, complete with exemplification. See, for instance T. H. Ferrigno, *Rigid Plastics Foams,* Reinhold Publishing Corporation, New York 1963, entire text, and especially pages 53–72 and 118–123; and "Polyurethans", *Encyclopedia of Polymer Science and Technology,* Interscience Publishers New York 1969, especially volume 11, pages 537–548.

It is not for its thermal insulating properties alone that rigid plastic foam is used for void-filling of article shells. A very important desired function of the foam is, by adherence to the interior walls of the shell, unification and rigidification of the article as a whole, i.e. to give the article structural strength and a feel of integrity, though light in weight.

The prior art article and method have been subject to drawbacks which have gone unrelieved for a number of years. Particularly, it is time-consuming to hold a hollow molded shell in the mold or fixture while waiting for it to cool, cure or set sufficiently to be removed and remain free-standing without drooping, wilting, warping or otherwise becoming distorted, and then to fill the shell cavity with foaming plastic in a separate operation. The two step operation is unduly labor intensive, and may call for additional capital investment, e.g. for jigs or fixtures to hold the shells while they are being foam-filled, in order to prevent or minimize warpage and other distortion due to local over-filling with foam.

In addition, the prior art process is believed to consume more ingredients than theoretically necessary in manufacture of the foam filling, since an excess customarily is used in an attempt to insure that the entire void within the hollow shell is filled with foamed plastic. Even so, it is a troublesome artifact of use of the prior art method, especially on articles such as hospital trays which will be put through heat cycles, e.g. in the course of being washed in a dishwasher, that the shell balloons or buckles away from the foamed core fairly early in the life of the article. The article then has an unwanted feel; it no longer seems to be a structurally integral article, but one with a flexible skin over a definite internal body. Indeed the article may give-off a crackling, rattling, grating sound during use, as its shell contacts and comes away from the core. Needless to say, to the extent that the core is separated from the shell, the desirable structural strength is degraded.

SUMMARY OF THE INVENTION

The molded shell of an article, while still warm from being molded, and while remaining within the mold or fixture in which it has been created, for instance by blow-molding of a parison of polyolefin plastic material into contact with the mold walls, is filled with a fluid, settable foaming plastic material, for instance polyurethane. This may be done by injecting the foaming mixture directly into the cavity of the shell. In this manner time, labor and materials are saved, and the resulting product is characterized by better adhesion of the foamed core to the internal wall surface of the shell.

The principles of the invention will be further discussed with reference to the drawings wherein a preferred embodiment is shown. The specifics illustrated in the drawings are intended to exemplify, rather than limit, aspects of the invention as defined in the claims.

DETAILED DESCRIPTION

Figure 2:
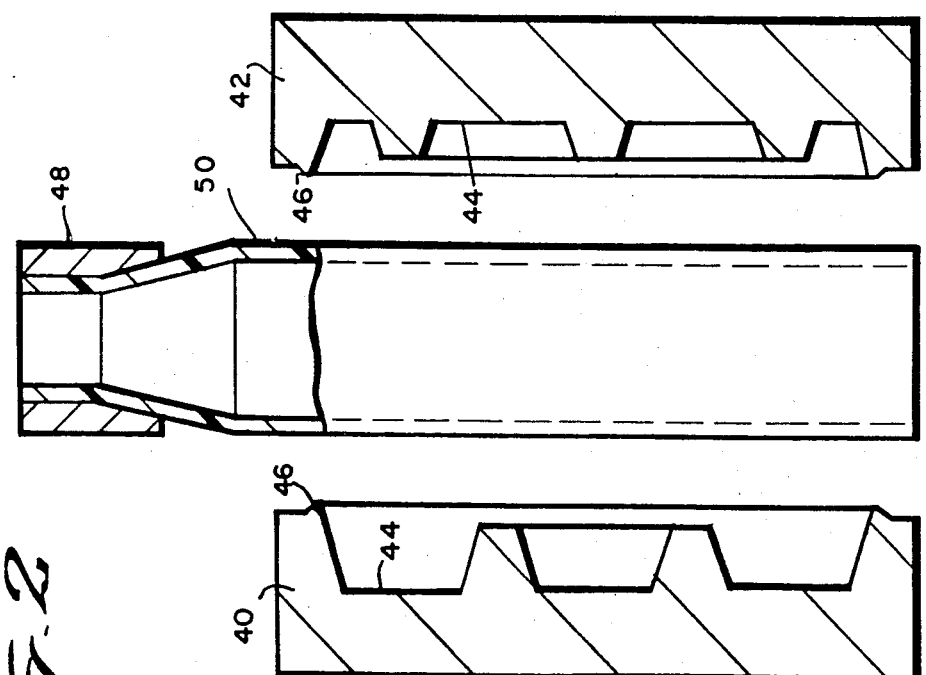
FIG. 2 is a diagrammatic view of a parison for the article shell being conventionally extruded into place between the mold-halves of a blow molding machine.

In FIG. 2, a standard blow-molding machine is illustrated in a general way by the showing of opposed mold halves 40, 42 which are movable horizontally toward and away from one another to close and open up a mold cavity defined by the internal surfaces 44.

(In the instance depicted, the mold cavity, shown opened-up, is designed for forming the shell of a tray article such as is used by hospitals and food service suppliers to airlines and the like, for keeping hot individual containers of food which are placed in the respective upwardly open recesses of a lower tray and covered by the respective downwardly open recesses of an upper, like tray. Thus a plurality of meals can be kept hot by stacking a plurality of such trays one on top of the other with containers of heated food enclosed in the cooperating recesses between vertically adjacent twos of the trays in the stack. for serving the meals, the trays are simply de-stacked, exposing the individual containers which thus have been kept hot.)

The mold cavity surfaces 44 are perimetrically bounded by respective rims 46 which tend to engage to clamp the parison in the mold as the mold closes, in order to define a closed volume that is subject to being inflated.

The conventional blow-molder is further shown being conventionally served by an extruding head 48 for extruding a tubular parison 50 of plastic into the space between the mold halves each time the mold cavity opens up.

Figure 3:
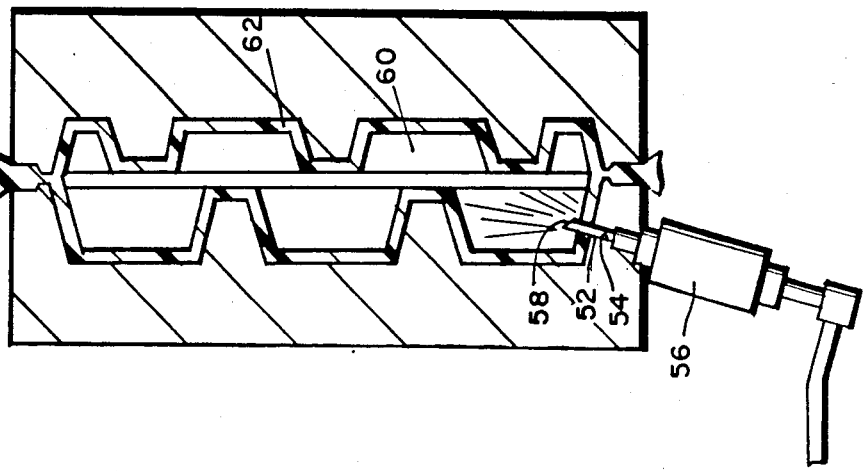
FIG. 3 is a diagrammatic view of a stage at which the mold halves have closed onto the parison defining a shell internal cavity which is being conventionally enlarged by inflating the plastic into intimacy with the mold cavity surfaces.

At the subsequent stage depicted in FIG. 3, the mold halves have been closed about the parison, defining a mold cavity and defining of the parison a closed volume that is subject to being inflated. Inflation is typically accomplished using a hollow needle 52 mounted in a bore 54 in one of the mold halves, on an extender/retractor cylinder arrangement 56. The needle 52 and the arrangement 56 are connected to a supply of compressed air. After the mold halves have closed creating the mold cavity, compressed air is communicated to the arrangement 56 which extends the needle in the bore 54 to such an extent that it pierces the clamped parison and causes the hollow needle tip 58 to become located in the internal void 60 of the clamped parison. Then, compressed air is introduced into the internal void inflating the clamped parison against the mold cavity surface to define the external size and shape of the article shell 62. The supply of compressed air then is cut off and the needle retracts. The puncture eventually substantially recloses and the scar is generally unnoticeable to the casual user of the finished product. Although one inflater 52-58 is depicted, in actual practice, a plurality of such inflaters which are distributed about the mold may be used, such practice being conventional.

(The conventional inflation device 52-58 is simply not depicted in FIG. 2.)

The conventional inflation device 52-58 that is depicted is but one example of the many generally similar sorts of such devices as are in common use in the blow molding industry. In a common variation the inflation probe is aligned on the parting line plane of the mold, so that it need not be thrust to pierce and then withdrawn after inflation, but merely remain stationary.

Figure 1:
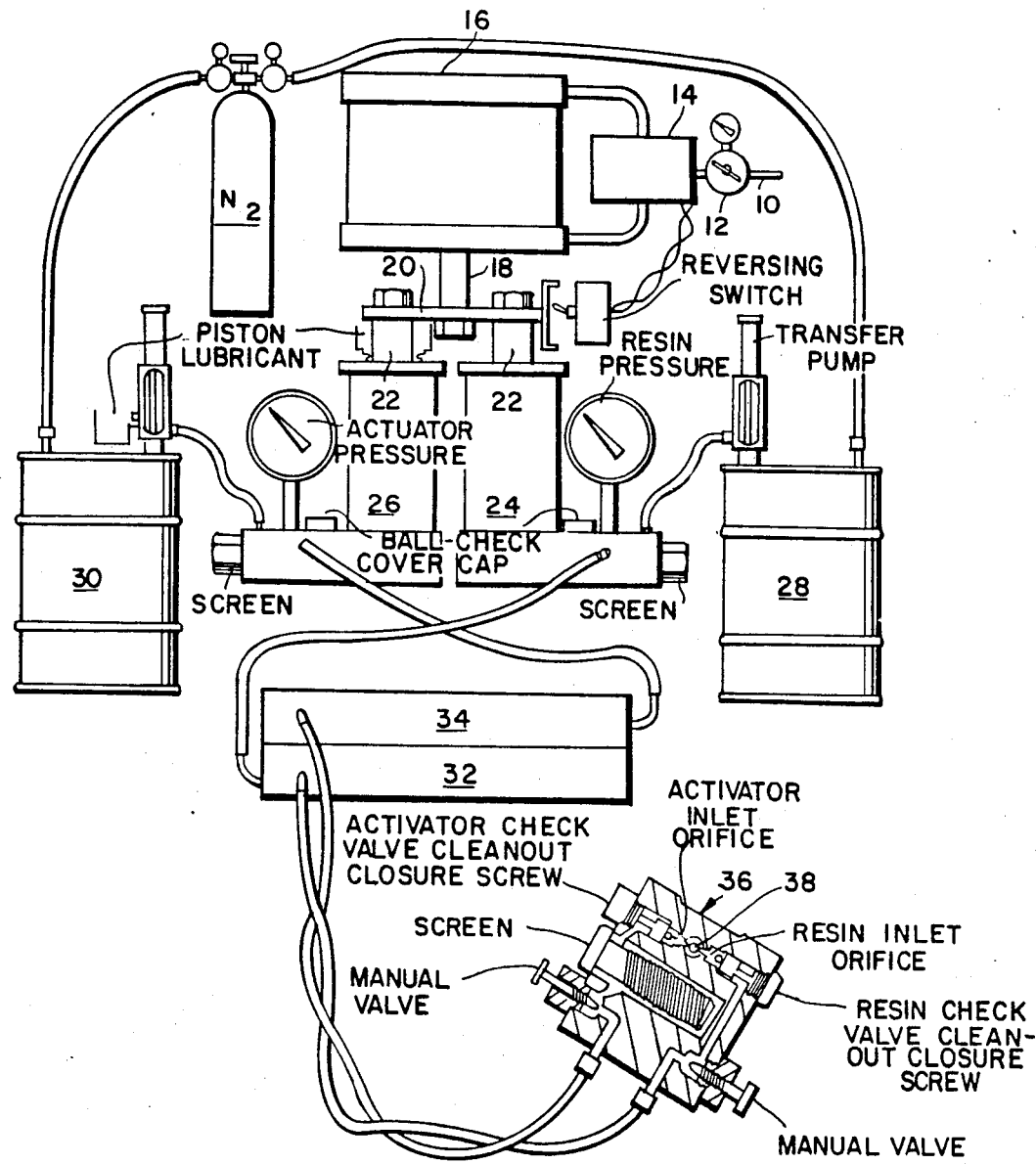
FIG. 1 is a diagrammatic view, with legends, of a commercially available prior art system for storing, supplying and mixing the ingredients of an in situ foaming void-filling plastic material such a polyrethane, and for ejecting the foaming composition from the nozzle of a gun.
Figure 4:
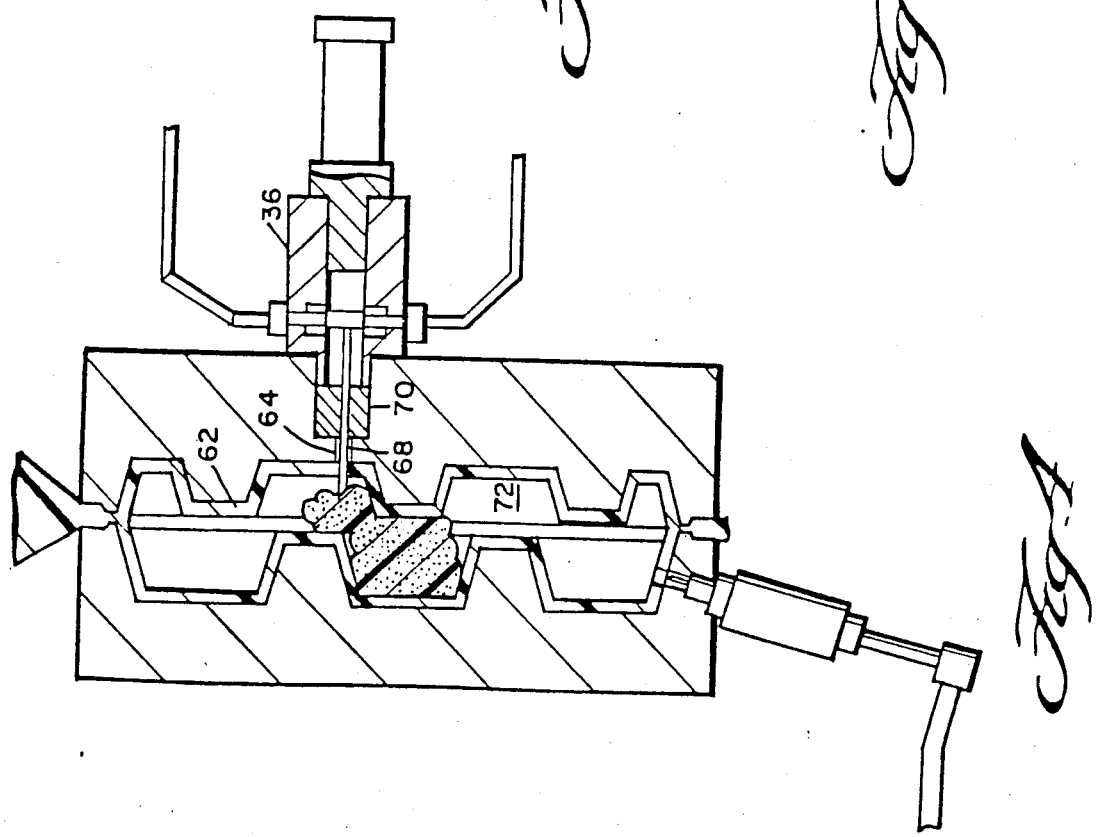
FIG. 4 is a diagrammatic view of a stage at which the distinguishing features of the present invention become more evident, in that here an injector is shown being used to fill the entire cavity of the just-molded article shell with foaming plastic while the article shell remains hot and in place within the mold.

All that has been described so far with regard to FIGS. 1–3 is utterly conventional and typical in everyday commercial practice. Differences attendant to practicing the principles of the present invention first become evident with regard to FIG. 4.

In order to practice the principles of the present invention, the mold or equivalent fixture 40, 42 is modified by providing another bore 64 therein intersecting with the mold cavity at a place corresponding to an inconspicuous site on the exterior of the article shell 62.

The ejector nozzle of the mixing and ejecting gun 36 of FIG. 1, is fitted with a hollow needle 68, which, if the bore 64 is not aligned on the parting line plane of the mold, is mounted on an extender/retractor cylinder arrangement 70 (like the one 56). The gun 36 and/or the arrangement 70 is mounted to the respective mold half. The arrangement 70 is connected to a source of compressed air for extending and retracting the hollow needle through the bore 64 into and out of the mold cavity. As with the needle 52, the site selected for the intersection of the bore 64 with the mold cavity is selected such that the small scar made by use of the needle to puncture and then withdraw from the article shell 62 will generally go unnoticed by the casual user of the finished article.

(The bore 64 and apparatus 68, 70 are simply not depicted in FIGS. 2 and 3.)

The gun 36 remains connected to an otherwise unmodified foamed plastic producing system such as is depicted in FIG. 1.

Accordingly, after the tubular parison of a selected thermoplastic material is extruded between the mold halves (FIG. 2) and the mold is closed and a slight pre-blow is applied through the air needle to trap enough air within the parison-enclosed space to hold the parison walls apart, and further air is introduced while vacuum is conventionally drawn through a plurality of holes (not shown) through the mold, conforming the warm thermoplastic against the mold cavity wall surface and thus defining the article shell FIG. 3, the air supply to the air needle or air needles is cut off. Any air needles not on the mold parting line plane are withdrawing, the sites where they had punctured the thermoplastic shell wall temporarily serving as vents through which air trapped within the article shell can flow out or be expelled.

Preferably, the plastic foam injecting needle 68 is extended to pierce the article shell at a moment in time when the article shell is still being inflated by the air nozzles and the article shell is still being pulled against the mold cavity wall surface by vacuum drawn through the mold wall, in order to prevent the thrusting, piercing action from locally distorting the article shell.

Figure 5:
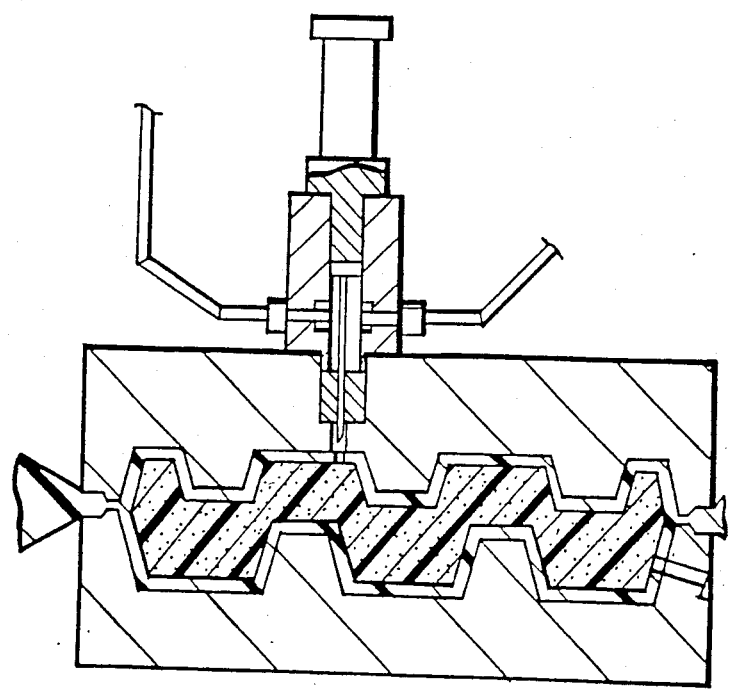
FIG. 5 is a diagrammatic view illustrating completion of the step which is shown being initiated in FIG. 4.

Once the article shell inflation air pressure is reduced by venting, but without further delay, the apparatus of FIG. 1 is operated to inject foaming plastic through the needle(s) 68 into the internal cavity 72 of the article shell. The length of time that the plastic injector operates, and the amount of plastic material injected depends on the volume of the cavity 72. As the injected plastic material foams and expands, the rigidifying foam pushes the wall of the article shell more tightly against the mold cavity surface. The conventionally cooled walls of the mold cool the thermoplastic of the shell while within the now foam-filled cavity 72 of the article shell, the foamed plastic cures and becomes generally rigid or solidified in its cellular condition (FIG. 5).

Figure 6:
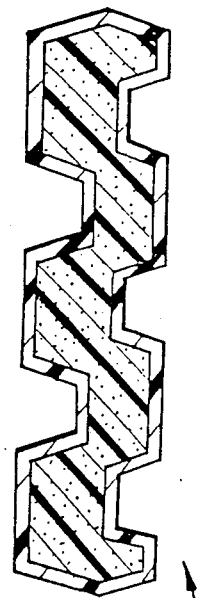
FIG. 6 is a diagrammatic cross-sectional view of a completed article produced by the process and with the apparatus of the present invention, the foam filling having set and remaining strongly adhered to the internal surface of the shell.

Finally, the mold is opened and the completed article 74 is removed (FIG. 6).

Having made the same products both ways, i.e. by the conventional method where the void-filling foam is installed in a separate step after the cooled article shell has been removed from the blow-molding machine, and by the method according to the present invention as described hereinabove, the inventor has found that the method of the present invention provides certain advantages in addition to a reduction in the time and labor needed to produce each article. Surprisingly, it has been found that approximately 30 percent less, by weight, of foamable plastic material needs to be injected into the article shell in order to produce a fully acceptable article having substantially equal thermal insulating properties.

Another important advantage, is that adhesion between the external surface of the set foamed plastic core and the internal cavity wall of the article shell is substantially improved in comparison with the prior art article. This is considered to be very important, because warping and buckling of the shell away from the core during autoclaving or commercial dishwashing of the article is virtually eliminated as a problem. The improvement in adhesion is believed to be accomplished when using the process of the invention because of the introduction of the foaming plastic composition into the void within the article shell while the article shell is still very hot, and is extensively confined against any expansion.

The principles of the present invention are further illustrated with reference to the following example, which relates to manufacturing of a food service tray of the type shown in FIGS. 2–6, using the method and apparatus of the present invention as described herein. All of the following details should be understood as being simply illustrative and not as limiting the scope or applicability of the present invention.

Make and Model of Blow Molding Machine
  Impco B-30
Weight of Article Shell
  750 grams
Average Wall Thickness of Article Shell
  0.070
Composition of Article Shell (a) Trade Name (b) Chemical Name
  polypropylene
  polypropylene
Amount of Time Delay Between When Inflating Air is Cut-Off and Gusmer Gun is Turned On
  10 seconds or less
Average Temperature of Article Shell Internal Cavity Wall Surface Temperature At Time Injection of Foamable Composition is Begun
  350 to 400 degrees
Average Temperature of Foamable Composition as Injected
  70 to 75 max
Composition of Resin and Activator Constituents of Foamable Composition (a) Trade Names (b) Chemical Names
  (a) Freeman isocyanate
  (b) Chempol 32-1973
Weight Ratio of Resin to Activator Constituents as Injected
  Equal by weight
Volume of Cavity of Article Shell
  1500 cc
Weight of Foaming Composition Injected Into Cavity
  100 grams
Amount of Time Taken for Injecting the Foaming Composition
  4 to 6 seconds
Amount of Time That the Article Remains in the Mold After Injection of the Foaming Composition Has Been Completed
  60 seconds
Surface Temperature of the Mold Cavity at the Time the Mold Closes on the Parison
  50 degrees approximately
Surface Temperature of the Mold Cavity at the Time the Mold Opens to Release the Finished Article
  50 degrees approximately It should now be apparent that the apparatus and method for producing molded hollow article with filling of foamed plastic thermal insulation, and article produced thereby as described hereinabove, possesses each of the attributes set forth in the specification under the heading "Summary of the Invention" hereinbefore. Because it can be modified to some extent without departing from the principles thereof as they have been outlined and in this specification, the present invention should be understood as encompassing all such modifications as are within the spirit and scope of the following claims.

What is claimed is:

1. A method for producing a molded hollow article with filling of foamed plastic thermal insulating material, comprising:
   inserting a hot precursor, made of polyolefin, for a polyolefin article shell into a relatively cool mold having a mold cavity with an internal molding surface therein;
   conforming the hot precursor against the internal molding surface to define an article shell having an internal cavity bounded by an internal surface of the article shell;
   introducing through the mold and through the article shell into the internal cavity of the article shell, a quantum of activated, foamable, settable polyurethane thermal insulation material while said article shell remains hot, so that as the article shell is being cooled from an elevated temperature by contact with the mold, the thermal insulation material foams, fills the internal cavity of the article shell, adhering to the internal surface of the article shell, and sets to form a foamed core of polyurethane that is extensively adhered to the article shell to define an article; and removing the article from the mold.

2. The method of claim 1, wherein:

the inserting step is performed by opening said mold, extruding a generally tubular parison within the open mold, and closing the mold onto the parison to perimetrically trappingly ring a portion of the parison within the mold cavity.

3. The method of claim 2, wherein:

the conforming step is performed, at least in part by inflation of said parison portion.

4. The method of claim 3, wherein:

the conforming step further includes drawing a vacuum through the mold externally of the parison portion.

5. The method of claim 1, wherein:

the introducing step comprises piercing the article shell with a hollow needle and injecting said activated, foamable, settable polyurethane thermal insulation material through the hollow needle into the article shell.

6. The method of claim 5, wherein:

the activated, foamable, settable polyurethane thermal insulation material comprises a mixture of an isocyanate, a polyether polyol, a catalyst and a blowing agent.

7. An article produced by the process of claim 1.

8. A molded hollow article with filling of foamed plastic thermal insulating material produced by the process of claim 1.

* * * * *